No. 799,733. PATENTED SEPT. 19, 1905.
E. HARTMANN.
MEANS OF SUPPORTING MOVABLE ELEMENTS OF ELECTRICAL INSTRUMENTS.
APPLICATION FILED JAN. 3, 1903.
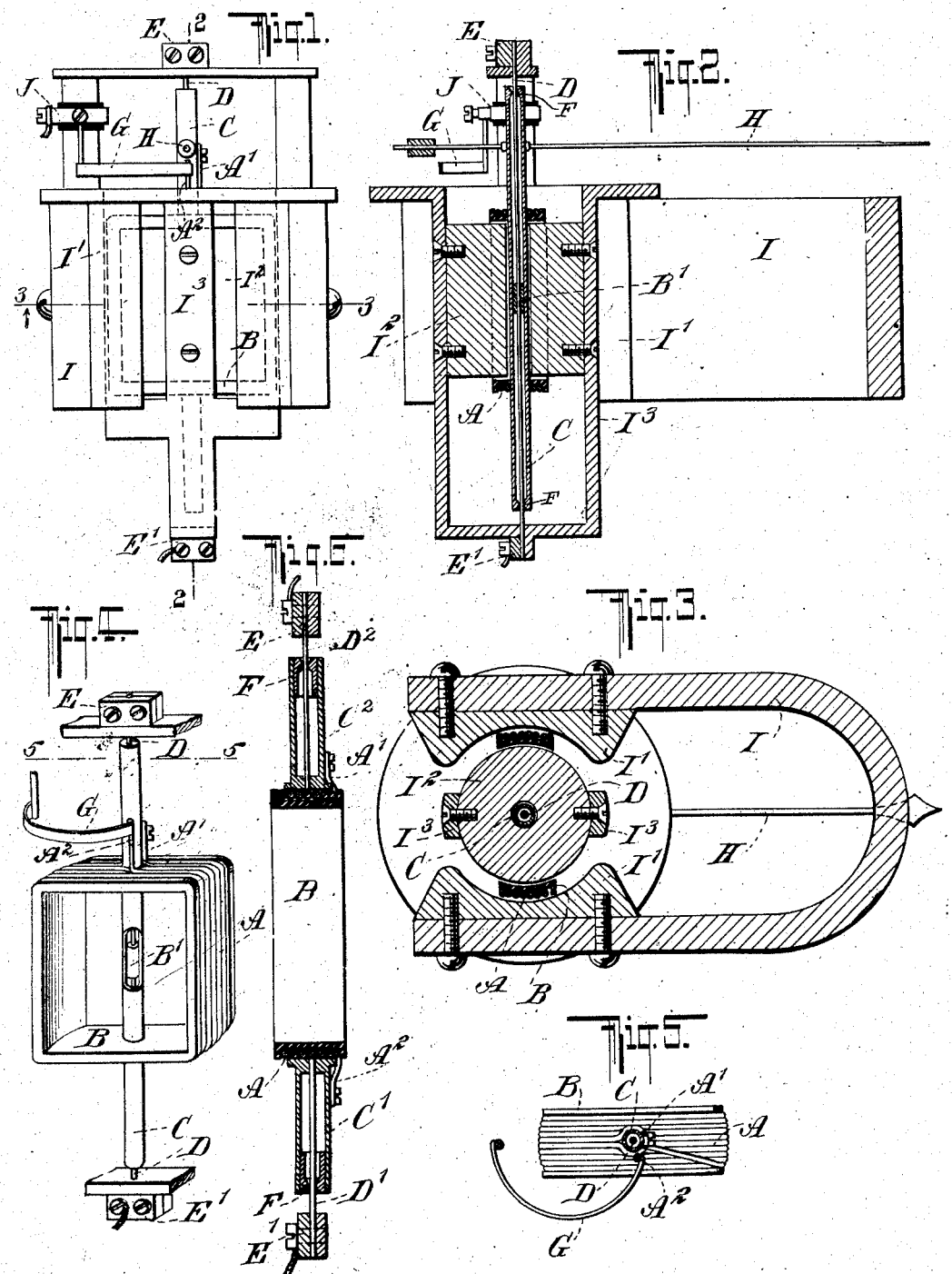

UNITED STATES PATENT OFFICE.

EUGEN HARTMANN, OF FRANKFORT-ON-THE-MAIN, GERMANY, ASSIGNOR TO THE FIRM OF HARTMANN & BRAUN A. G. FABRIK ELECTRISCHER MESSINSTRUMENTE, OF FRANKFORT-ON-THE-MAIN, GERMANY.

MEANS OF SUPPORTING MOVABLE ELEMENTS OF ELECTRICAL INSTRUMENTS.

No. 799,733. Specification of Letters Patent. Patented Sept. 19, 1905.

Application filed January 3, 1903. Serial No. 137,666.

*To all whom it may concern:*

Be it known that I, EUGEN HARTMANN, professor, electrical engineer, residing at Obere Königstrasse 9, Frankfort-on-the-Main, German Empire, have invented new and useful Improvements in Means of Supporting Movable Elements of Electrical Instruments, of which the following is a specification.

The present invention relates to a new manner of suspending movable bodies—such as, for instance, coils—in electrical instruments.

The invention has the object to reduce as much as possible the friction of the movable system. Moreover, the invention affords protection against trembling and jars, which are so detrimental to instruments the movable bodies of which are carried on points.

According to the present invention the movable body—say the turning coil—of an electrical measuring instrument is connected near its center to a wire or thread passing through the coil. The latter is provided with a tube encircling the supporting-wire and carrying bearings or eyes.

In the accompanying drawings, Figure 1 is an end view of an electrical instrument embodying my invention. Fig. 2 is a vertical section thereof on line 2 2 of Fig. 1. Fig. 3 is a horizontal section on line 3 3 of Fig. 1 looking upward. Fig. 4 is a perspective view of the movable member of the instrument. Fig. 5 is a horizontal section substantially on line 5 5 of Fig. 4; and Fig. 6 is a vertical section of the movable member, showing a slightly different construction.

As shown in Figs. 1 to 5, the coil or bobbin A is wound on a body or frame B substantially of rectangular shape, which is connected with a vertical tube C. Near the center the tube C is connected, as at B', with a wire or thread D, which is stretched between the clamps E E', one of which also serves as a binding-post. The tube C concentrically surrounds the supporting-wire D. In both ends of the tube bearings or eyes F are provided, through which the wire D passes. These bearings may be made of jewels fitted to the supporting-wire D and form a frictionless guide for the wire near the points at which it is secured by the clamps E E'. The tube carrying the bearings and connected to the middle of the wire may be replaced with any suitable support of proper shape. With the tube is connected a pointer or other suitable indicator H. The clamps E E' are secured to a suitable frame carried by the magnet I, having pole-pieces I' and also having a core-piece I², carried by bars I³. The tube C extends loosely through the said core-piece, as shown in Figs. 2 and 3. The frame B, with the coil A, swings in the space between the pole-pieces I' and the core-piece I².

The current is supplied to the windings of the coil A at one end A' through the tube C and the supporting-wire D and at the other end by means of a thin flexible metal ribbon G, the other end of which is connected to a binding-post J.

Instead of passing the tube C through the frame B and connecting the wire D in the middle of the tube, as shown in Figs. 2 and 4, the tube may be interrupted, or composed of two short tubes C' and C², respectively, each having its separate wire D' and D², respectively, as shown in Fig. 6. These wires are not electrically connected with each other except through the medium of the coil A, it being understood that one end of the coil is connected with the wire D', as by means of the tube C', while the other end of the coil is connected to the wire D², as through the medium of the tube C². The wires D' D² are then connected with suitable terminals, which may be formed by the clamps E E'.

In each of the constructions shown the movable member is nicely suspended for measuring purposes and will work reliably even when it is not in an exactly vertical position, and the entire system is protected against disturbing mechanical influences.

The torsion power of the stretched supporting-wire may be used as directing or counter power. If this is not sufficient, cylindrical or flat coiled spiral springs may be arranged, either single or double acting.

Now what I claim, and desire to secure by Letters Patent, is the following:

1. In an electrical instrument, a movable coil, wire secured to the coil and also to a stationary support, and bearings secured to the coil and located adjacent to the stationary ends of said wire, and surrounding the latter.

2. A movable body fastened to stretched wire and bearings through which said wire passes substantially as described.

3. In an electrical instrument the combination with a movable coil of stretched wire on which the coil is fastened and which passes through bearings near the fixed or stationary ends of said wire substantially as described.

4. In an electrical instrument the combination with a movable coil of stretched wire on which the coil is fastened and which is passed through bearings supported on the body of the coil substantially as described.

5. In an electrical instrument, a movable coil, wire secured thereto and also to a stationary support, and bearings surrounding said wire adjacent to the stationary ends thereof.

6. In an electrical instrument the combination with a movable coil of stretched wire passed near its fixed or stationary ends through bearings on the body of the coil and means for supplying electrical current to the coil substantially as described.

7. In an electrical instrument the combination with a movable coil of a stretched wire composed of two pieces of wire connected respectively with the ends of said coil but otherwise electrically insulated from each other and bearings on the coil and encircling the wires near their outer ends substantially as described.

8. In an electrical instrument, a movable coil with projecting tube portions having bearings adjacent to their outer ends, and wire secured to said coil and to a stationary support and extending through said tube portions and bearings.

In testimony whereof I have signed my name to this specification in the presence of two subscribing witnesses.

EUGEN HARTMANN.

Witnesses:
ROBERT BÜHL,
JEAN GRUND.